US010122065B2

(12) United States Patent
Tenno

(10) Patent No.: US 10,122,065 B2
(45) Date of Patent: Nov. 6, 2018

(54) ANTENNA DEVICE, CARD INFORMATION MEDIUM, ELECTRONIC APPARATUS, AND METHOD FOR MANUFACTURING ANTENNA DEVICE

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/652,284

(22) Filed: Jul. 18, 2017

(65) Prior Publication Data

US 2017/0317401 A1     Nov. 2, 2017

Related U.S. Application Data

(63) Continuation of application No. PCT/JP2016/061347, filed on Apr. 7, 2016.

(30) Foreign Application Priority Data

Apr. 8, 2015  (JP) ................................ 2015-079408

(51) Int. Cl.
 *H01Q 1/38* (2006.01)
 *H01Q 1/22* (2006.01)
 (Continued)

(52) U.S. Cl.
 CPC ......... *H01Q 1/22* (2013.01); *G06K 19/07773* (2013.01); *G06K 19/07779* (2013.01);
 (Continued)

(58) Field of Classification Search
 CPC .. H01Q 1/22; H01Q 1/38; H01Q 7/00; H01Q 1/243; H01Q 1/273
 (Continued)

(56) References Cited

U.S. PATENT DOCUMENTS

2011/0124299 A1* 5/2011 Koujima .......... G06K 19/07749
 455/73
2014/0176382 A1* 6/2014 Nakano .................. H01Q 1/243
 343/788

FOREIGN PATENT DOCUMENTS

JP  2009-284476 A  12/2009
JP  2014-107606 A   6/2014
WO  2012/173080 A1 12/2012

OTHER PUBLICATIONS

Official Communication issued in International Patent Application No. PCT/JP2016/061347, dated Jun. 21, 2016.

* cited by examiner

*Primary Examiner* — Andrea Lindgren Baltzell
(74) *Attorney, Agent, or Firm* — Keating & Bennett, LLP

(57) ABSTRACT

An antenna device includes a coil including first linear conductors on a first principal surface side of a multilayer body, second linear conductors on a second principal surface side, first end-surface conductors and second end-surface conductors disposed on end surfaces. Each of the first linear conductors includes a first main portion, a first end portion, and a second end portion. Each of the second linear conductors includes a second main portion, a third end portion, and a fourth end portion. The width of each of the first end-surface conductors is smaller than the width of the first main portion and the width of the second main portion. The width of each of the second end-surface conductors is smaller than the width of the first main portion and the width of the second main portion.

20 Claims, 11 Drawing Sheets

(51) Int. Cl.
*G06K 19/077* (2006.01)
*H01Q 7/00* (2006.01)
*H01F 5/00* (2006.01)
*H01Q 1/24* (2006.01)
*H01Q 1/27* (2006.01)

(52) U.S. Cl.
CPC ............ *H01F 5/003* (2013.01); *H01Q 1/2275* (2013.01); *H01Q 1/38* (2013.01); *H01Q 7/00* (2013.01); *H01Q 1/243* (2013.01); *H01Q 1/273* (2013.01)

(58) Field of Classification Search
USPC ......................................................... 343/866
See application file for complete search history.

ANTENNA DEVICE, CARD INFORMATION MEDIUM, ELECTRONIC APPARATUS, AND METHOD FOR MANUFACTURING ANTENNA DEVICE

CROSS REFERENCE TO RELATED APPLICATIONS

This application claims the benefit of priority to Japanese Patent Application No. 2015-079408 filed on Apr. 8, 2015 and is a Continuation Application of PCT Application No. PCT/JP2016/061347 filed on Apr. 7, 2016. The entire contents of each application are hereby incorporated herein by reference.

BACKGROUND OF THE INVENTION

1. Field of the Invention

The present invention relates to antenna devices, and in particular to an antenna device defining a chip coil antenna and a manufacturing method therefor. The present invention also relates to a card information medium and an electronic apparatus including an antenna device.

2. Description of the Related Art

A typical surface-mount antenna device including a coil antenna includes a helical coil formed of conductive patterns disposed on an insulating layer. Of the conductive patterns, a conductive pattern extending along the lamination direction is formed of a via hole (via conductor). The via hole is typically formed by making a plurality of through holes in a multilayer body by laser processing or punching and filling the through holes with conductive paste.

Typically, if a via conductor is exposed at an end surface of a multilayer body, a short circuit may be frequently caused by fine dust, faint printing, splatting of solder at the time of mounting, or the like. In particular, if the end-surface via is formed by filling with electrode paste, the inserted electrode paste may extend to an adjacent end surface conductor, and this may lead to the risk of causing a short circuit between the neighboring end surface conductors.

SUMMARY OF THE INVENTION

Preferred embodiments of the present invention provide antenna devices capable of preventing the occurrence of shorting at an end surface of a multilayer body and being effective to improve the yield rate and provide card information media and electronic apparatuses including the antenna devices.

An antenna device according to a preferred embodiment of the present invention includes a multilayer body in which a plurality of insulating layers are laminated, and a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to a lamination direction in which the insulating layers are laminated in the multilayer body, the end-surface conductor connecting the two end portions in the linear conductors in the lamination direction. In a parallel direction with respect to the surface of the insulating layers and the end surface of the multilayer body, a width of the end-surface conductor is smaller than a width of the main portion, and an interval between the end-surface conductors adjacent to each other is wider than an interval between the main portions being next to each other.

In the above-described configuration, the interval between the end-surface conductors adjacent to each other is increased, and the possibility of shorting between the end-surface conductors is lessened. Because the line width of the main portion in the linear conductor is able to be set at a predetermined width, an increase in conductor loss is significantly reduced or prevented.

A preferred embodiment of the present invention includes a line width of each of the two end portions which is preferably smaller than a line width of the main portion in the parallel or substantially parallel direction with respect to the surface of the insulating layers and the end surface of the multilayer body.

If the border between the thick linear conductor and the thin end-surface conductor is positioned in a corner portion (ridge) of the multilayer body, current would concentrate on the corner portion, and the resistance value would increase. In the above-described configuration, the border between the thick portion and the thin portion in the conductors of the coil is disposed on the surface of the insulating layer, and concentration of current and an increase in resistance value is able to be significantly reduced or prevented.

In a preferred embodiment of the present invention, each of the two end portions may preferably have a shape in which its line width gradually decreases as a distance from the main portion increases.

In the above-described configuration, there is no point at which the line width of the linear conductor drastically changes (there is no portion in which its line width changes discontinuously), and concentration of current and an increase in resistance value are able to be significantly reduced or prevented.

In a preferred embodiment of the present invention, in each of the two end portions, a line width of a portion that is adjacent to the main portion may preferably be larger than a line width of a portion that is remote from the main portion.

In the above-described configuration, the change in line width from the main portion to the end-surface conductor is reduced, and concentration of current and an increase in resistance value are able to be significantly reduced or prevented.

In a preferred embodiment of the present invention, a width of a connection portion between the end-surface conductor and each of the two end portions may preferably differ from the line width of the end-surface conductor.

In the above-described configuration, the tolerance of displacement of the location where the end-surface conductor and each of the two end portions are connected is increased, and failures in connecting the two end portions and end-surface conductor are prevented.

In a preferred embodiment of the present invention, the connection portion between the end-surface conductor and each of the two end portions may preferably be arranged inside the edges of the insulating layers.

In the above-described configuration, because the location where the end-surface conductor and each of the two end portions are connected is remote from (inside) the corner portion in the multilayer body, current concentration in the corner portion in the insulating layer is able to be significantly reduced or prevented.

In a preferred embodiment of the present invention, the end-surface conductor may preferably include a plurality of interlayer connection conductors linking together.

In the above-described configuration, because the cross-sectional area of the end-surface conductor is increased, the resistance value of the end-surface conductor is able to be significantly reduced or prevented. Because the interlayer connection conductors are arranged in the surface direction of the insulating layer in manufacturing in a parent substrate state, even if the locations of the division lines are relatively displaced to some degree, the parent substrate is able to be cut such that the end-surface conductors reliably remain on both sides in a cross section. That is, the tolerances for the accuracy in the cut locations in the parent substrate and the accuracy in the locations of the first and second end-surface conductors are increased.

In a preferred embodiment of the present invention, each of the interlayer connection conductors may preferably have a circular or oval cross-sectional shape.

In the above-described configuration, even if the locations where the interlayer connection conductors are provided are displaced, the cross-sectional area of the end-surface conductor is able to be maintained large, and the resistance value of the end-surface conductor is able to be significantly reduced or prevented.

A card information medium according to a preferred embodiment of the present invention includes an antenna and a memory. The antenna includes a multilayer body in which a plurality of insulating layers are laminated, and a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to a lamination direction in which the insulating layers are laminated in the multilayer body, the end-surface conductor connecting the two end portions in the linear conductors in the lamination direction. In a parallel direction with respect to the surface of the insulating layers and the end surface of the multilayer body, a width of the end-surface conductor is smaller than a width of the main portion, and an interval between the end-surface conductors adjacent to each other is wider than an interval between the main portions being next to each other.

In the above-described configuration, the card information medium having a reduced conductor loss and including the small antenna is able to be provided.

An electronic apparatus according to a preferred embodiment of the present invention includes an antenna and a casing that houses the antenna. The antenna includes a multilayer body in which a plurality of insulating layers are laminated, and a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to a lamination direction in which the insulating layers are laminated in the multilayer body, the end-surface conductor connecting the two end portions in the linear conductors in the lamination direction. In a parallel or substantially parallel direction with respect to the surface of the insulating layers and the end surface of the multilayer body, a width of the end-surface conductor is smaller than a width of the main portion, and an interval between the end-surface conductors adjacent to each other is wider than an interval between the main portions being next to each other.

In the above-described configuration, the electronic apparatus having a reduced conductor loss and including the small antenna is able to be provided.

A method of manufacturing an antenna device according to a preferred embodiment of the present invention is described below. The antenna device includes a multilayer body in which a plurality of insulating layers are laminated, and a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to a lamination direction in which the insulating layers are laminated in the multilayer body, the end-surface conductor connecting the two end portions in the linear conductors in the lamination direction. The method includes the steps of forming a paste pattern corresponding to the plurality of linear conductors on the insulating layers, forming through holes in the plurality of insulating layers and filling the through holes with conductive paste of the end-surface conductors, laminating the plurality of insulating layers and firing the lamination of the plurality of insulating layers, and cutting the multilayer body along a line passing through the plurality of end-surface conductors. A width of each of the end-surface conductors is smaller than a width of the main portions.

According to the above-described manufacturing method, the interval between the end-surface conductors adjacent to each other is increased, and the possibility of shorting between the end-surface conductors is lessened. The line width of the main portion in the linear conductor is able to be set at a predetermined width, and an increase in conductor loss is able to be reduced or prevented.

According to various preferred embodiments of the present invention, the antenna device, small card information medium, and electronic apparatus capable of preventing shorting between the end-surface conductors and of reducing or preventing an increase in conductor loss are obtainable.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
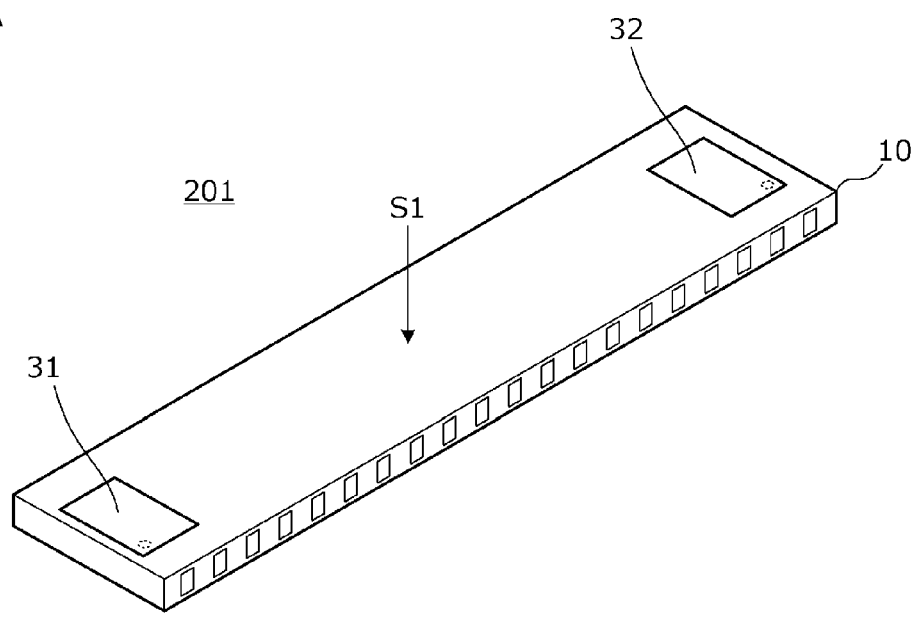
FIG. 1A is a perspective view of an antenna device 201 according to a first preferred embodiment of the present invention.

The "antenna devices" illustrated in the preferred embodiments of the present invention discussed below is an antenna that radiates a magnetic flux. The antenna devices are preferably an antenna used in vicinity communication that employs magnetic coupling with an antenna on the other end and may be used in, for example, near-field communication (NFC). One example of the antenna device may be used in the high frequency (HF) band and in particular may be used in frequencies at or near 13.56 MHz, for example. The size of the antenna device is sufficiently small for the wavelength λ at the used frequency, and the radiation characteristics of electromagnetic waves in the used frequency band are not good. The size of a coil antenna included in the antenna device described below preferably is equal to or less than about λ/10, for example. The wavelength λ indicates an effective wavelength determined in consideration of the advantageous effect of reducing the wavelength achieved by the dielectricity and magnetic permeability of a base on which the antenna is provided. Both ends of a coil conductor included in the coil antenna are connected to a feed circuit that uses the frequency band (HF band, in particular, in the vicinity of 13.56 MHz).

A plurality of preferred embodiments of the present invention are described below with reference to the drawings by using several concrete examples. The same reference numerals are used in similar portions in the drawings. For the sake of brevity, the items common to the first preferred embodiment are not described in the second and subsequent preferred embodiments, and different points are described. In particular, substantially the same operational advantages achieved by substantially the same configurations are not mentioned individually for each preferred embodiment.

First Preferred Embodiment

Figure 1B:
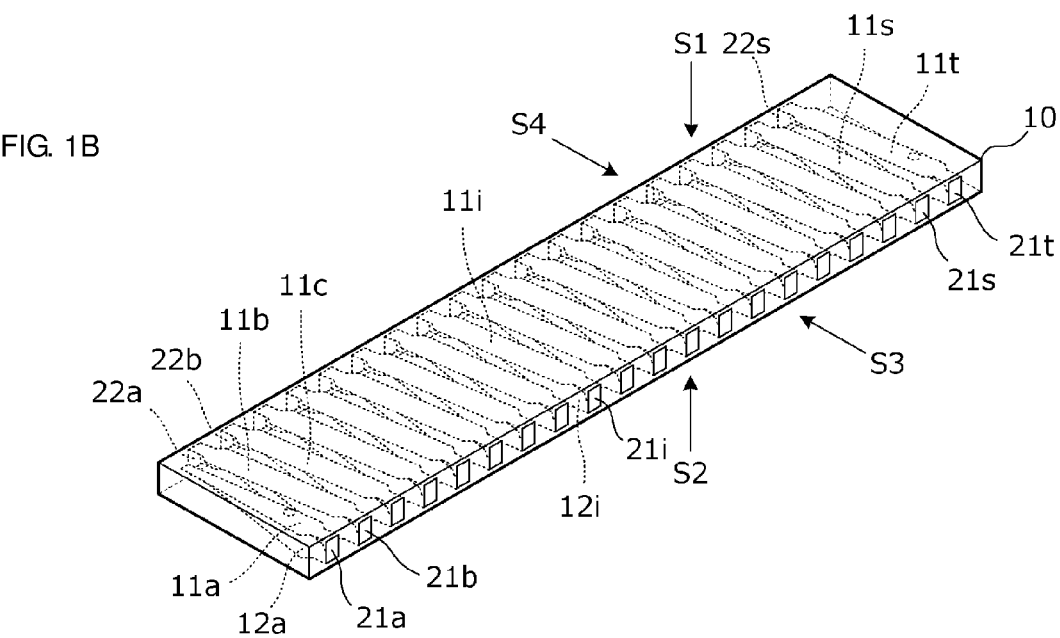
FIG. 1B illustrates the structure inside the antenna device 201.

FIG. 1A is a perspective view of an antenna device 201 according to a first preferred embodiment of the present invention. FIG. 1B illustrates the structure inside the antenna device 201.

The antenna device 201 includes a multilayer body 10 having a rectangular or substantially rectangular parallelepiped shape. The multilayer body 10 includes a first principal surface S1, a second principal surface S2 opposed to the first principal surface S1, and end surfaces S3 and S4 connecting the first principal surface S1 and second principal surface S2. As illustrated in FIG. 1A, outer connection electrodes 31 and 32 are preferably disposed on the first principal surface S1 of the multilayer body 10. The antenna device 201 is surface-mounted on a circuit board by connecting the outer connection electrodes 31 and 32 to lands on the circuit board.

First linear conductors (including 11a-11c, 11i, 11s, and 11t) are disposed the first principal surface S1 side of the multilayer body 10 (on a surface positioned inside the first principal surface S1 with an insulating layer 1a described below interposed therebetween). That is, preferably 20 of the first linear conductors are provided on the first principal surface S1 side. Second linear conductors (including 12a, 12b, 12i, 12s, and 12t) are disposed the second principal surface S2 side of the multilayer body 10 (on a surface positioned inside the second principal surface S2 with an insulating layer 1e described below interposed therebetween). That is, preferably 20 of the second linear conductors are provided on the second principal surface S2 side of the multilayer body 10.

First end-surface conductors (including 21a, 21b, 21i, 21s, and 21t) connecting first end portions of the first linear conductors including 11a to 11t and third end portions of the second linear conductors including 12a to 12t are disposed on the end surface S3 of the multilayer body 10. That is, the 20 first end-surface conductors are arranged on the end surface S3 of the multilayer body 10. Second end-surface conductors (including 22a, 22b, 22i, 22r, and 22s) connecting second end portions of the first linear conductors including 11a to 11t and fourth end portions of the second linear conductors including 12a to 12t are disposed on the end surface S4 of the multilayer body 10. That is, the 19 second end-surface conductors are arranged on the end surface S4 of the multilayer body 10.

The above-described first linear conductors including 11a to 11t, second linear conductors including 12a to 12t, first end-surface conductors including 21a to 21t, and second end-surface conductors including 22a to 22s define a flat rectangular or substantially rectangular helical coil antenna. The number of each of the first linear conductors, second linear conductors, first end-surface conductors, and second end-surface conductors is not limited to the one described above.

Figure 2:
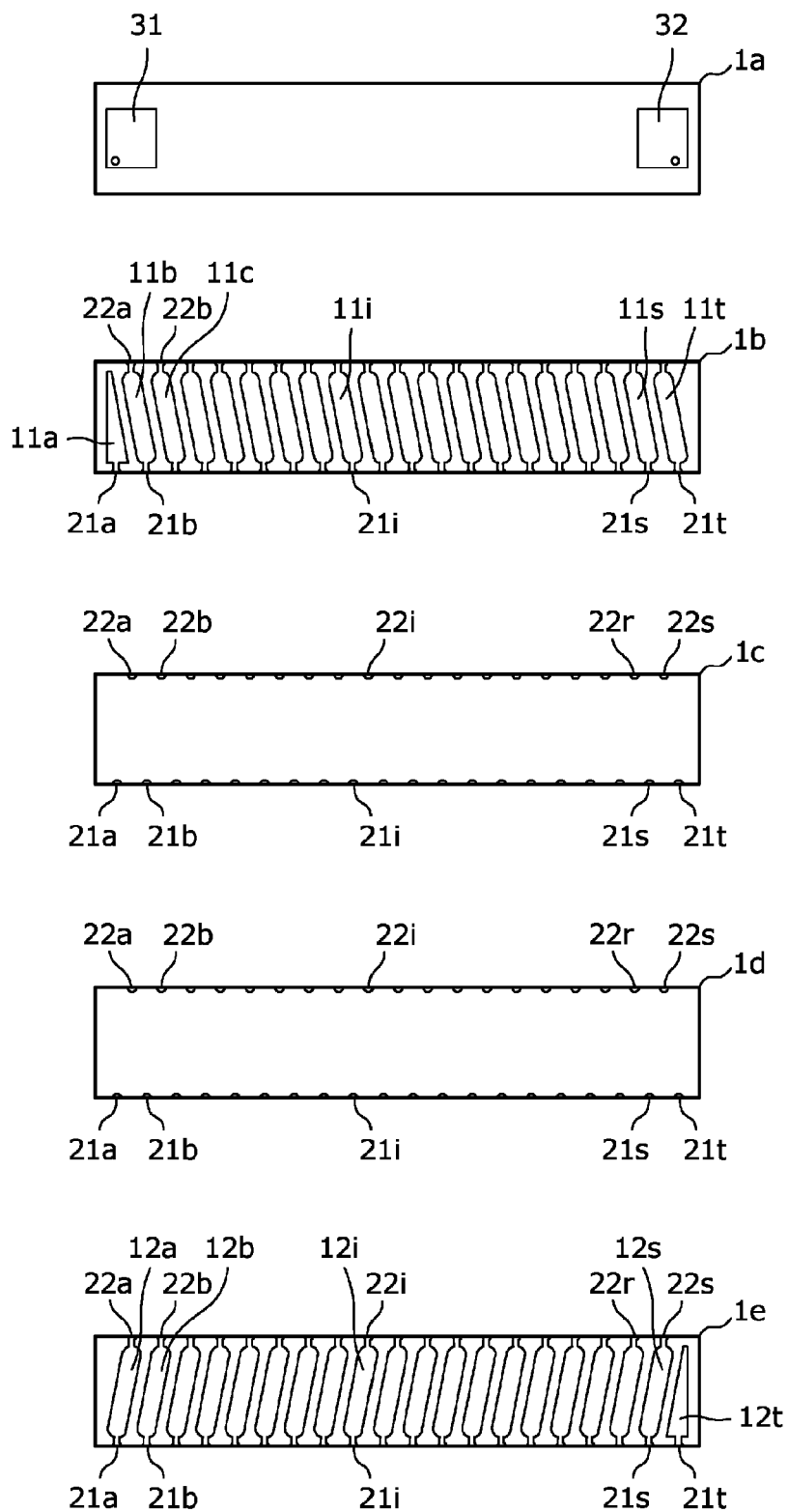
FIG. 2 is an exploded plan view of the antenna device 201 and illustrates insulating layers 1a to 1e, which are components of a multilayer body 10.

FIG. 2 is an exploded plan view of the antenna device 201 and illustrates insulating layers 1a to 1e, which are components of the multilayer body 10.

The insulating layer 1a is positioned the first principal surface S1 side, and the insulating layer 1e is positioned the second principal surface S2 side. The outer connection electrodes 31 and 32 are disposed on the upper surface of the insulating layer 1a. The plurality of first linear conductors including 11a to 11t, each of which includes two end portions on outer edges of the insulating layer 1b and a main portion connecting the two end portions, are disposed on the upper surface of the insulating layer 1b. The plurality of second linear conductors including 12a to 12t, each of which includes two end portions on outer edges of the insulating layer 1e and a main portion connecting the two end portions, are disposed on the upper surface of the insulating layer 1e. The first end-surface conductors including 21a to 21t and the second end-surface conductors including 22a to 22s are disposed on the insulating layers 1b, 1c, and 1d.

The insulating layers 1b, 1c, and 1d are preferably made of magnetic ferrite, and the insulating layers 1a and 1e are preferably made of non-magnetic ferrite.

In the example illustrated in FIG. 2, only the three insulating layers 1b, 1c, and 1d are disposed between the first linear conductors including 11a and 11t and the second linear conductors including 12a to 12t. The number of the insulating layers between the first linear conductors including 11a to 11t and the second linear conductors including 12a to 12t may be one, two, four or more. An increased number of layers can lead to an increased size of the coil opening. For example, each of the insulating layers 1a and 1e, which are non-magnetic layers, may have a thickness of about 25 μm, five magnetic insulating layers each having a thickness of about 50 μm may be laminated, and thus the total thickness of the magnetic layers may be about 250 μm.

Magnetic layers may be arranged on the outer side portions of the first and second linear conductors. That is, all of the layers constituting the multilayer body 10 may be magnetic layers. For example, the insulating layers 1a and 1e illustrated in FIG. 2 may be magnetic ferrite. When non-magnetic layers are disposed on the outer side portions of the first linear conductors including 11a to 11t and second linear conductors including 12a to 12t, the magnetic path of a magnetic flux occurring from the coil antenna in the antenna device 201 is only an open magnetic path. Thus, the magnetic flux occurring from the coil antenna in the antenna device 201 extends outside the multilayer body 10 at the first principal surface S1, second principal surface S2, end surface S3, and end surface S4. This facilitates magnetic coupling between the coil antenna in the antenna device 201 and an antenna on the other end, increases the coefficient of coupling between the coil antenna in the antenna device 201 and the antenna on the other end, and improves the communication characteristics.

All of the layers defining the multilayer body 10 may be non-magnetic layers.

Figure 3A:
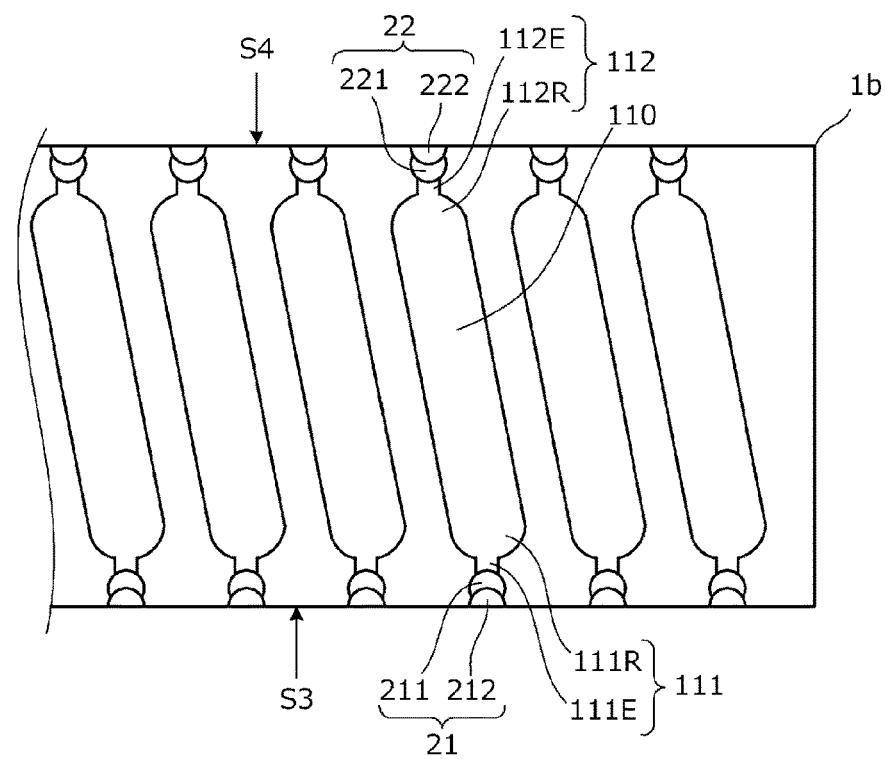
FIGS. 3A and 3B are partial plan views that illustrate in detail the structure of first linear conductors, second linear conductors, first end-surface conductors, and second end-surface conductors.
Figure 3B:
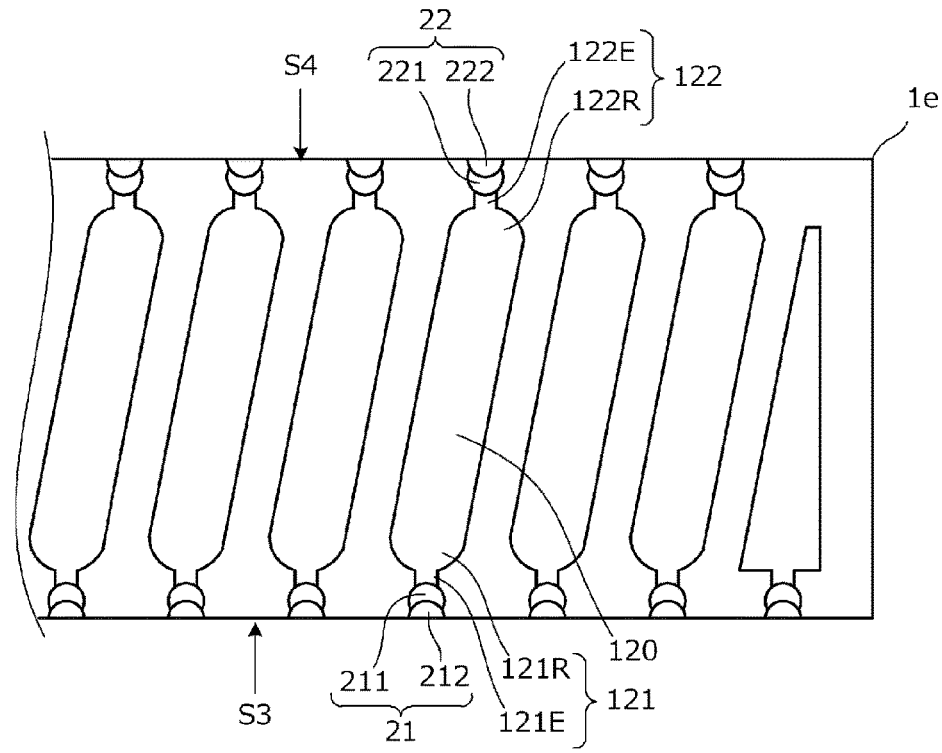

FIGS. 3A and 3B are partial plan views that illustrate in detail the structure of the first linear conductors, second linear conductors, first end-surface conductors, and second end-surface conductors. Each of the first linear conductors includes a first main portion 110, a first end portion 111, and a second end portion 112. The first end portion 111 preferably includes a portion 111R connected to the first main portion 110 and a portion 111E connected to the first end-surface conductor 21. The second end portion 112 preferably includes a portion 112R connected to the first main portion 110 and a portion 112E connected to the second end-surface conductor 22. Similarly, each of the second linear conductors preferably includes a second main portion 120, a third end portion 121, and a fourth end portion 122. The third end portion 121 preferably includes a portion 121R connected to the second main portion 120 and a portion 121E connected to the first end-surface conductor 21. The fourth end portion 122 preferably includes a portion 122R connected to the second main portion 120 and a portion 122E connected to the second end-surface conductor 22.

The "main portions" in the first main portion 110 and second main portion 120 correspond to a main portion in the first linear conductor and that in the second linear conductor, respectively, and one example thereof may be a portion that occupies about 50% or more of the linear conductor, for example.

The first end-surface conductor 21 preferably includes a portion 211 directly connected to the first end portion 111 and third end portion 121 and a portion 212 exposed to the end surface S3 of the multilayer body 10. The second end-surface conductor 22 includes a portion 221 directly connected to the second end portion 112 and fourth end portion 122 and a portion 222 exposed to the end surface S4 of the multilayer body 10.

Figure 4A:
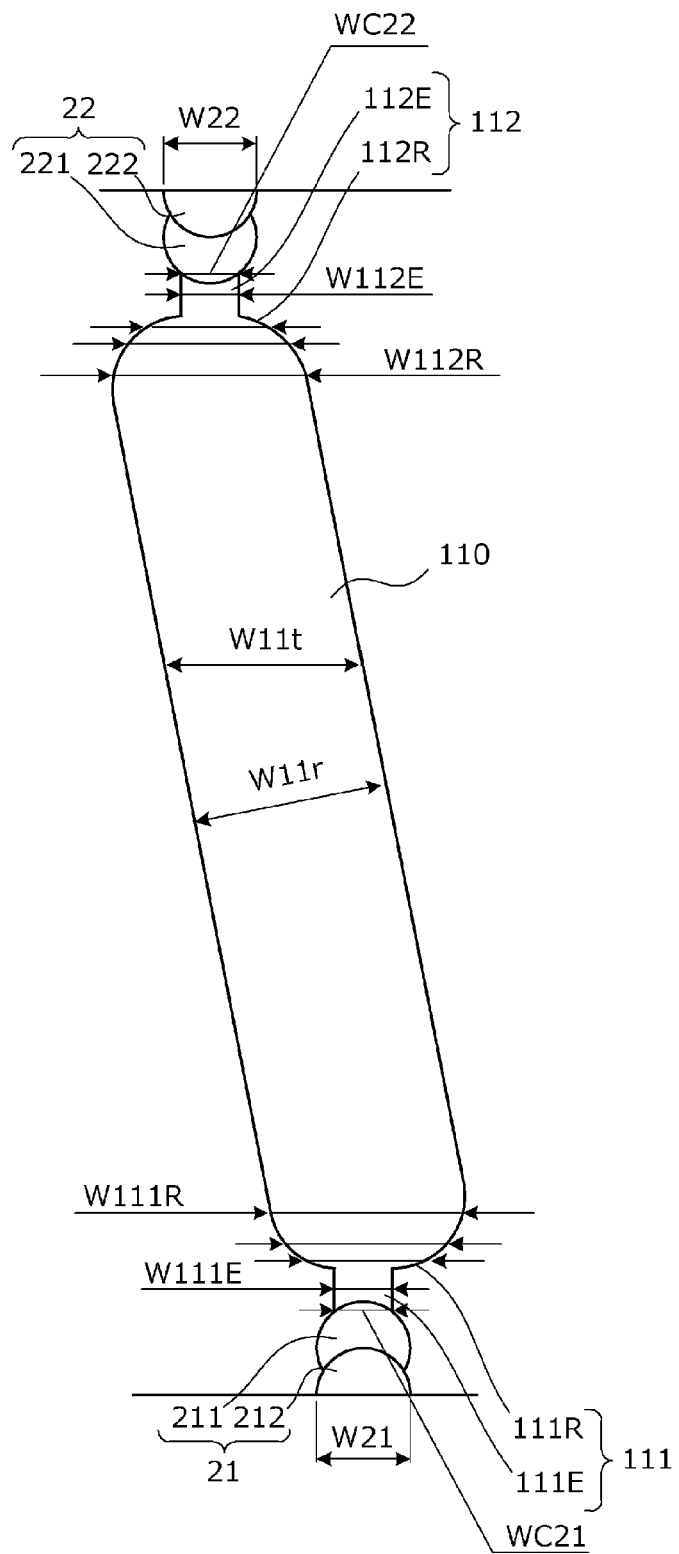
FIG. 4A is a partial plan view that illustrates dimensions of the first linear conductor, first end-surface conductor, and second end-surface conductor.
Figure 4B:
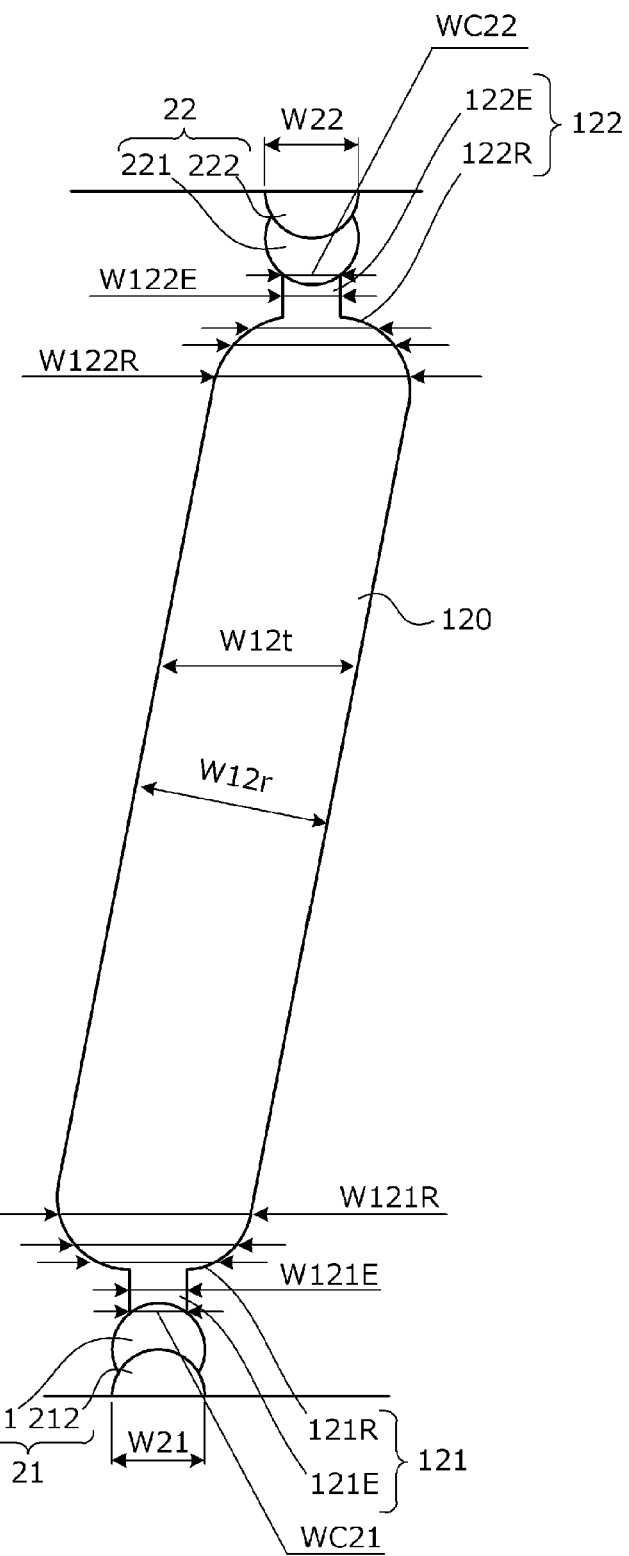
FIG. 4B is a partial plan view that illustrates dimensions of a second linear conductor, first end-surface conductor, and second end-surface conductor.

FIG. 4A is a partial plan view that illustrates preferred dimensions of the first linear conductor, first end-surface conductor, and second end-surface conductor. FIG. 4B is a partial plan view that illustrates dimensions of the second linear conductor, first end-surface conductor, and second end-surface conductor. In FIGS. 4A and 4B, the width of the first main portion 110 can be represented by a width W11r in the direction perpendicular or substantially perpendicular to the direction in which the first main portion 110 extends or a width W11t in the direction in which the plurality of first main portions 110 are arranged. Similarly, the width of the second main portion 120 can be represented by a width W12r in the direction perpendicular or substantially perpendicular to the direction in which the second main portion 120 extends or a width W12t in the direction in which the plurality of second main portions 120 are arranged. The line width of the widest portion in the first end portion 111 is W111R, and the line width of the narrowest portion therein is W111E. The line width of the widest portion in the second end portion 112 is W112R, and the line width of the narrowest portion therein is W112E. The line width of the widest portion in the third end portion 121 is W121R, and the line width of the narrowest portion therein is W121E. The line width of the widest portion in the fourth end portion 122 is W122R, and the line width of the narrowest portion therein is W122E.

A width W21 of the first end-surface conductor 21 is smaller than the width W11t or W11r of the first main portion 110 and smaller than the width W12t or W12r of the second main portion 120. A width W22 of the second end-surface conductor 22 is smaller than the width W11t or W11r of the first main portion 110 and smaller than the width W12t or W12r of the second main portion 120.

The line width of the first end portion 111 indicated by the dimension from W111R to W111E is smaller than the line width W11t or W11r of the first main portion 110. The line width of the second end portion 112 indicated by the dimension from W112R to W112E is smaller than the line width W11t or W11r of the first main portion 110.

The line width of the third end portion 121 indicated by the dimension from W121R to W121E is smaller than the line width W12t or W12r of the second main portion 120. The line width of the fourth end portion 122 indicated by the dimension from W122R to W122E is smaller than the line width W12t or W12r of the second main portion 120.

The portion 111R in the first end portion preferably has a shape that tapers down as the distance from the first main portion 110 increases. The portion 112R in the second end portion has a shape that tapers down as the distance from the first main portion 110 increases. That is, each of the first end portion 111 and second end portion 112 has a shape in which its line width gradually decreases as the distance from the first main portion 110 increases. Similarly, each of the third end portion 121 and fourth end portion 122 preferably has a shape in which its line width gradually decreases as the distance from the second main portion 120 increases.

A width WC21 of a connection portion between the first end portion 111 or third end portion 121 and the first end-surface conductor 21 differs from the line width W21 of the first end-surface conductor 21. A width WC22 of a connection portion between the second end portion 112 or fourth end portion 122 and the second end-surface conductor 22 preferably differs from the line width W22 of the second end-surface conductor 22. In the present preferred embodiment, the width WC21 of the connection portion between each of the first end portion 111 and third end portion 121 and the first end-surface conductor 21 is smaller than the line width W21 of the first end-surface conductor 21, and the width WC22 of the connection portion between each of the second end portion 112 and fourth end portion 122 and the second end-surface conductor 22 is smaller than the line width W22 of the second end-surface conductor 22.

However, the width WC21 of the connection portion between each of the first end portion 111 and third end portion 121 and the first end-surface conductor 21 may be larger than the width W21 of the first end-surface conductor 21. The width WC22 of the connection portion between each of the second end portion 112 and fourth end portion 122 and the second end-surface conductor 22 may be larger than the width W22 of the second end-surface conductor 22.

Figure 5:
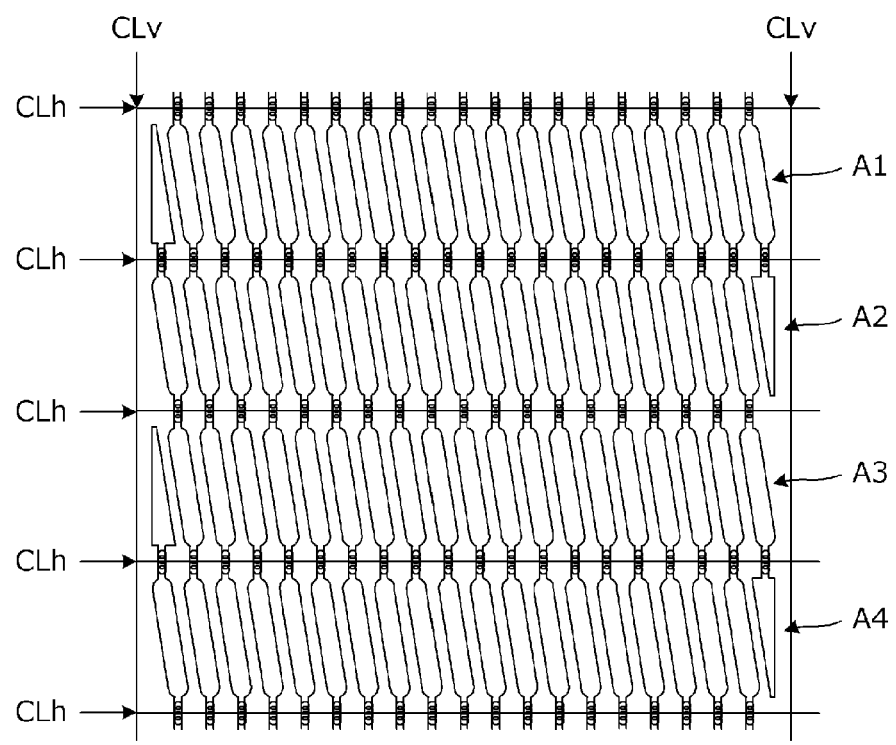
FIG. 5 is a plan view of a multilayer body with the first linear conductors in a parent substrate state.
Figure 6:
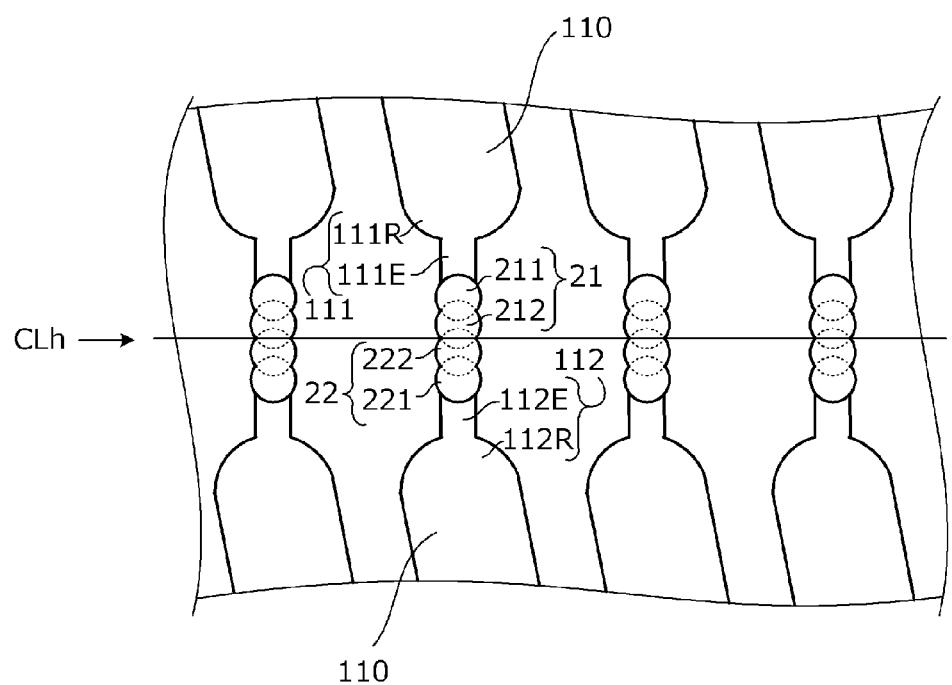
FIG. 6 illustrates the structure in the vicinity of a division line when pieces are separated from the parent substrate.
Figure 7:
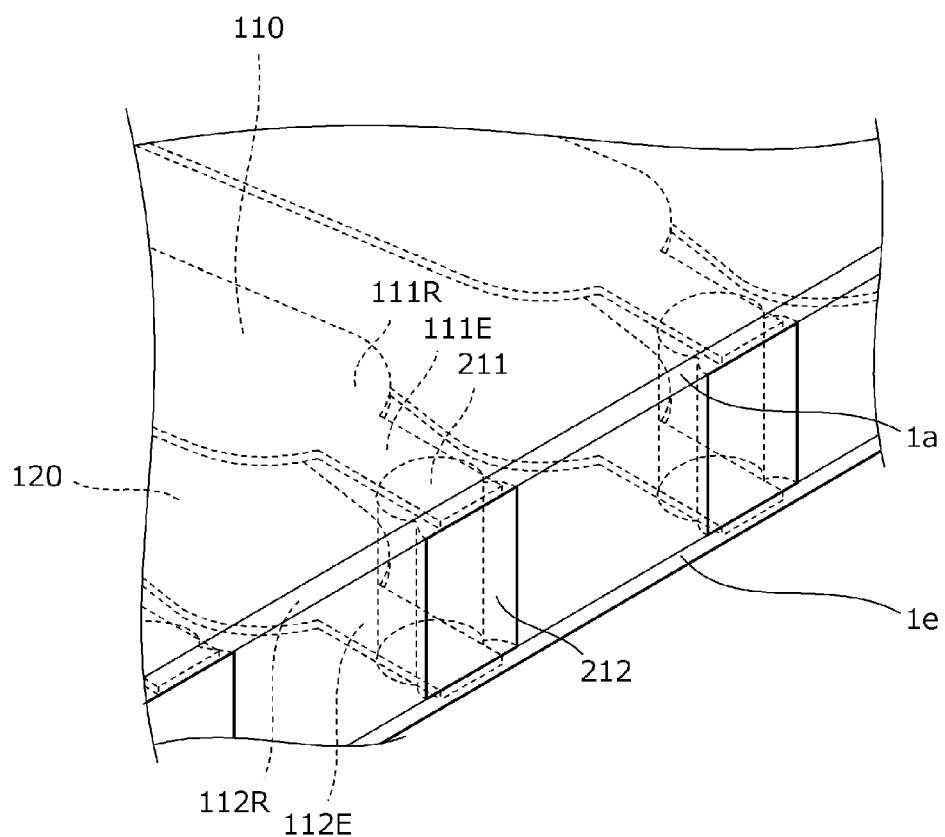
FIG. 7 is a partial perspective view that illustrates the structure in the vicinity of an end surface of the antenna device.

FIG. 5 is a plan view of a multilayer body with the first linear conductors in a parent substrate state according to a preferred embodiment of the present invention. FIG. 6 illustrates the structure in the vicinity of a division line when pieces are separated from the parent substrate. In FIG. 6, the insulating layer corresponding to the insulating layer 1a illustrated in FIG. 2 is removed. FIG. 7 is a partial perspective view that illustrates the structure in the vicinity of the end surface of the antenna device. A method for manufacturing the antenna device 201 is described below with reference to these drawings and FIGS. 2 and 3.

(1) The outer connection electrodes 31 and 32 are formed on the insulating layer 1a.

(2) A paste pattern of the first linear conductors including 11a to 11t is formed on the insulating layer 1b. A paste pattern of the second linear conductors including 12a to 12t is formed on the insulating layer 1e.

(3) Through holes used in forming interlayer connection conductors are formed at predetermined locations in the outer connection electrodes 31 and 32 on the insulating layer 1a by laser processing or the like. Each of the through holes used in forming the interlayer connection conductors may preferably have a circular or oval cross-sectional shape.

(4) Through holes are formed at predetermined locations in the insulating layers 1b, 1c, and 1d preferably by laser processing or the like.

(5) The holes in the insulating layers 1a to 1d are filled with conductive paste, and the interlayer connection conductors are formed.

(6) The insulating layers 1a to 1e are stacked and bonded together by pressure, and thus the multilayer body is formed.

(7) The multilayer body is fired.

(8) In the process described so far, the insulating layers and multilayer body have sizes corresponding to a parent substrate and include regions of a plurality of antenna devices. After that, the multilayer body is cut along the cutting lines CLv and CLh illustrated in FIG. 5, and regions A1, A2, A3, A4, . . . are separated as antenna devices.

The antenna devices are manufactured by the above-described method. Conductive patters similar to the outer connection electrodes 31 and 32 may be formed on the back side of the insulating layer 1e as conductive patterns for reducing curling.

As illustrated in FIG. 6, the first end-surface conductor 21 and second end-surface conductor 22 are preferably formed of a plurality of interlayer connection conductors linking together. The multilayer body is cut along the cutting line CLh such that the interlayer connection conductors are cut transversely. The first end-surface conductor and second end-surface conductor are exposed at the cut section.

In the present preferred embodiment, the linear conductors on both the insulating layers 1b and 1e satisfy the above-described relationship between the shapes of the main portions and end portions, relationship with the end-surface conductors, and the like. The linear conductors on either one of the insulating layers may satisfy the above-described relationships. Any one of the plurality of linear conductors being arranged may satisfy the above-described relationships. One of the end portions in a linear conductor may satisfy the above-described relationships.

The present preferred embodiment provides the advantages described below.

By providing the first end-surface conductors with 21a to 21t and second end-surface conductors including 22a to 22s narrower than the main portions 110 in the first linear conductors including 11a to 11t and the main portions 120 in the second linear conductors including 12a to 12t, the occurrence of shorting between the end-surface conductors is prevented. Because the widths of the main portions 110 and 120 in the first and second linear conductors are not narrowed, an increase in resistance value is able to be significantly reduced or prevented. In addition, because the intervals between the linear conductors are not widened, the possibility of a minor loop (magnetic flux loop that circulates such that it escapes between the linear conductors) is lessened, and a reduction in communication characteristics resulting from the minor loop (e.g., a reduction in the coefficient of coupling between the coil antenna in the antenna device 201 and the antenna on the other end) is also able to be prevented.

Each of the interlayer connection conductors that define the first end-surface conductor 21 and second end-surface conductor 22 preferably have a circular or oval cross-sectional shape. Accordingly, because the first end-surface conductor 21 and second end-surface conductor 22 do not have corner portions (e.g., portions having interior angles smaller than about 180 degrees in a polygon), an increase in resistance value caused by concentration of current in the corner portions does not occur.

The connection portion between the first end portion 111 or third end portion 121 and the first end-surface conductor 21 is preferably located in a region inside the corners of the multilayer body 10, and the connection portion between the second end portion 112 or fourth end portion 122 and the second end-surface conductor 22 is arranged in a region inner the corners of the multilayer body 10. Accordingly, the current does not concentrate in the corner portions in the first end portion 111 in the first linear conductor or the corner portions in the third end portion 121 in the second linear conductor, and this significantly reduces or prevents an increase (loss) of the resistance value.

The first end-surface conductor 21 and second end-surface conductor 22 are formed of a plurality of interlayer connection conductors linking together, the multilayer body is cut along the cutting line CLh such that the interlayer connection conductors are cut transversely, and thus the areas of the cross sections of the first end-surface conductor 21 and second end-surface conductor 22 are increased. Thus, the resistance values of the end-surface conductors 21 and 22 are significantly reduced. Because the interlayer connection conductors are located in the surface direction of the first principal surface and second principal surface in manufacturing in a parent substrate state, if the locations of the cutting lines are relatively displaced to some degree, the parent substrate is able to be cut such that the end-surface conductors reliably remain on both sides in a cross section. That is, the tolerances for the accuracy in the cut locations in the parent substrate and the accuracy in the locations where the first and second end-surface conductors are formed are increased.

Each of the first end portion 111 and second end portion 112 in each of the first linear conductors (including 11a to 11t) preferably has a shape in which its line width gradually decreases as the distance from the first main portion 110 increases, and each of the third end portion 121 and fourth end portion 122 in each of the second linear conductors (including 12a to 12t) preferably has a shape in which its line width gradually decreases as the distance from the second main portion 120 increases. Thus, each of the first linear conductor and second linear conductor does not have a portion in which its line width drastically changes (does not have a portion in which its line width changes discontinuously, and its impedance change is smooth), current concentration and impedance mismatching are able to be significantly reduced or prevented. As a result, an increase (loss) of the resistance value is significantly reduced or prevented. By suppressing the impedance mismatching, an electromagnetic energy is diffused into the coil antenna in the antenna device 201, and the communication characteristics are improved.

The line width of the connection portion with the first end-surface conductor 21 in the first end portion 111 in each of the first linear conductors (11a to 11t) and that in the third end portion 121 in each of the second linear conductors (12a to 12t) are different from the line width of the first end-surface conductor 21. The line width of the connection portion with the second end-surface conductor 22 in each of the second end portion 112 and fourth end portion 122 is different from the line width of the second end-surface conductor 22. Because of this structure, the tolerance for displacement of the location where each of the first end portion 111 and third end portion 121 is connected to the first end-surface conductor 21 is increased, and the tolerance for displacement of the location where each of the second end portion 112 and fourth end portion 122 is connected to the second end-surface conductor 22 is increased. Thus, failures in connecting each of the first end portion 111 and third end portion 121 and the first end-surface conductor 21 and failures in connecting each of the second end portion 112 and fourth end portion 122 and the second end-surface conductor 22 are prevented.

Because the surfaces of the first linear conductors including 11a to 11t and second linear conductors including 12a to 12t are covered with the insulating layers, the possibility of a short circuit in the first and second linear conductors caused by fine dust and splatting of solder at the time of mounting is lessened. Because an external connection terminal used in mounting is able to be located outside the multilayer body while the length of the coil portion in the coil axis direction is maintained, the antenna device is able to be miniaturized.

In the present preferred embodiment, the example using the multilayer body 10 preferably with a rectangular or substantially rectangular parallelepiped shape is illustrated. However, the multilayer body 10 can have any desirable shape.

In the present preferred embodiment, the example in which the plurality of first linear conductors including 11a to 11t and the plurality of second linear conductors including 12a to 12t are arranged in sequence along the longitudinal direction of the multilayer body 10 having the rectangular or substantially rectangular parallelepiped shape is illustrated. The plurality of linear conductors may be arranged in sequence along the lateral direction of the multilayer body 10 having the rectangular or substantially rectangular parallelepiped shape.

In the present preferred embodiment, the example in which the first main portion 110 in the first linear conductors and the second main portion in the second linear conductors extend in a straight line is illustrated. They may have a shape in which the main portions 110 and 120 change their thicknesses (e.g., frustum or spindle shape).

In the present preferred embodiment, the example in which all of the first end-surface conductors 21 and all of the second end-surface conductors 22 are preferably narrower than the first main portions 110 and second main portions 120, respectively, is illustrated. Only either the first end-surface conductors 21 or second end-surface conductors 22 may be narrower than the corresponding main portions. Only some end-surface conductors of the first end-surface conductors 21 and second end-surface conductors 22 may be narrower than the main portions in the linear conductors connected thereto. In both cases, the advantages achieved by preferred embodiments of the present invention are also provided.

In the present preferred embodiment, the example in which all of the first end portions 111 and second end portions 112 are narrower than the first end-surface conductors 21 and second end-surface conductors 22, respectively, is illustrated. Only either the first end portions 111 or second end portions 112 may be narrower than the corresponding end-surface conductors. Only some end portions of the first end portions 111 and second end portions 112 may be narrower than the end-surface conductors connected thereto. In both cases, the advantages achieved by preferred embodiments of the present invention are also provided.

Second Preferred Embodiment

Figure 8A:
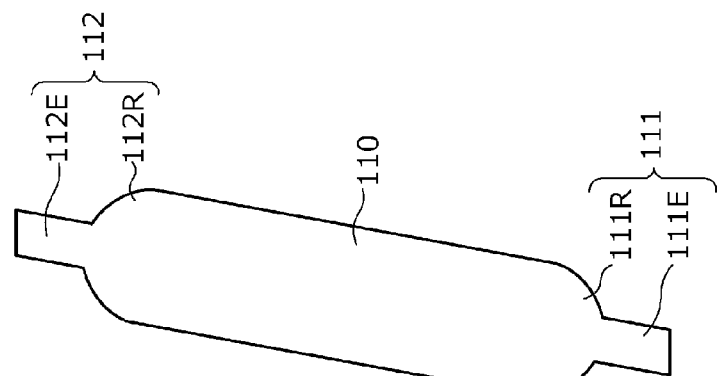
FIGS. 8A-8D illustrate example shapes of the first and second end portions in the first linear conductor.
Figure 8B:
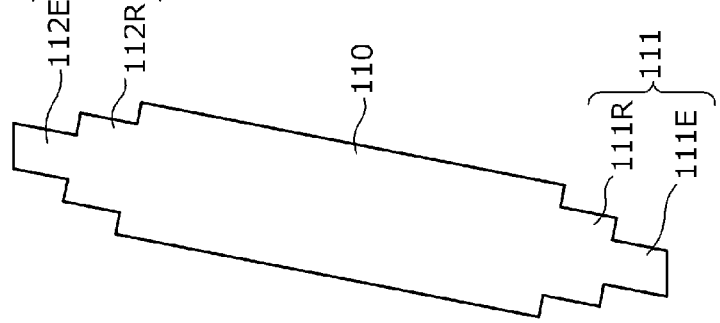
Figure 8C:
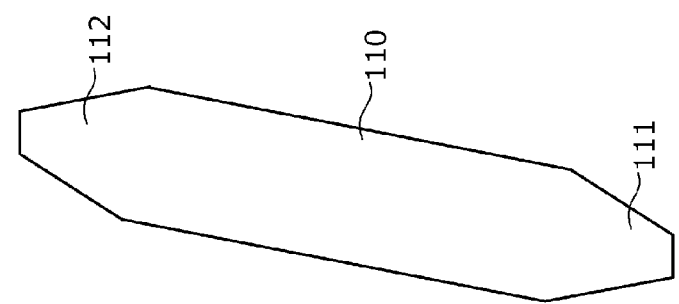
Figure 8D:
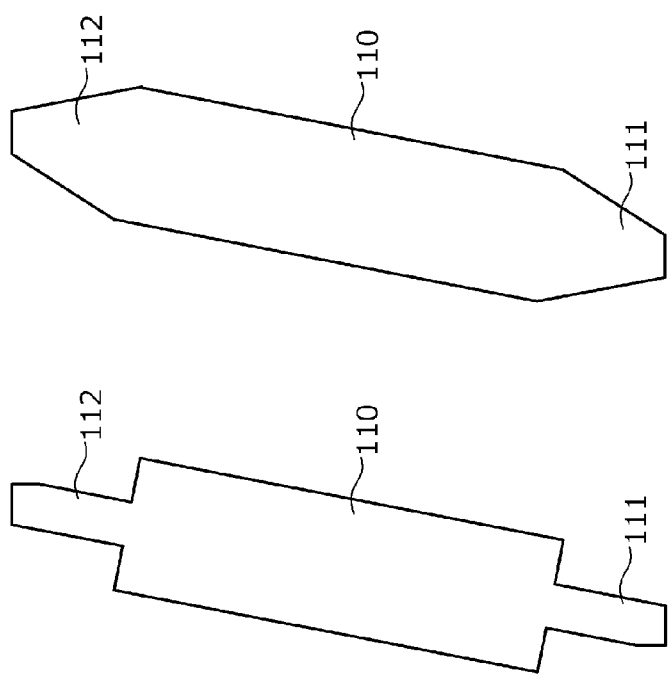

In a second preferred embodiment, some example shapes of the first end portion and second end portion in the first linear conductor are illustrated. In the example illustrated in FIG. 8A, the line width of each of the first end portion 111 and second end portion 112 in the first linear conductor is smaller than the line width of the first main portion 110. In the example illustrated in FIG. 8B, each of the first end portion 111 and second end portion 112 has a frustum shape in which the line width tapers down from the first main portion 110. In the example illustrated in FIG. 8C, the portion 111R, which is near the first main portion 110, in the first end portion 111 has a line width larger than the line width of the portion 111E, which is remote from the first main portion 110, and smaller than the line width of the first main portion 110. Similarly, the portion 112R, which is near the first main portion 110, in the second end portion 112 has a line width larger than the line width of the portion 112E, which is remote from the first main portion 110, and smaller than the line width of the first main portion 110. In the example illustrated in FIG. 8D, the portion 111R, which is near the first main portion 110, in the first end portion 111 has a shape that tapers down from the line width of the first main portion 110. The portion 112R, which is near the first main portion 110, in the second end portion 112 has a shape that tapers down from the line width of the first main portion 110.

FIGS. 8A-8D illustrate the first linear conductor. The second linear conductor may have various shapes, as in the case of the first linear conductor.

Third Preferred Embodiment

Figure 9A:
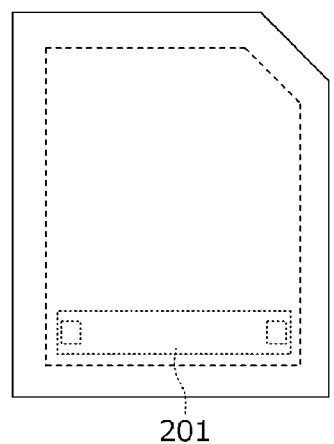
FIG. 9A is a plan view of a card information medium according to a third preferred embodiment of the present invention.
Figure 9B:
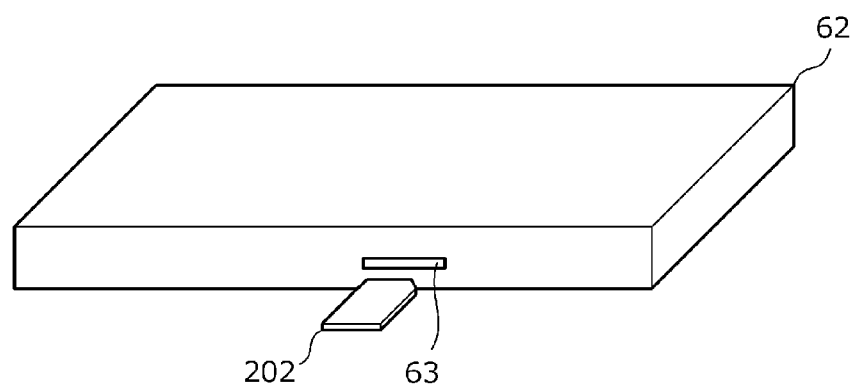
FIG. 9B is an external perspective view of an electronic apparatus in which the card information medium is attachable.

In a third preferred embodiment of the present invention, an example card information medium in the present invention is illustrated. FIG. 9A is a plan view of a card information medium according to the third preferred embodiment. FIG. 9B is an external perspective view of an electronic apparatus in which the card information medium is attachable.

The electronic apparatus preferably includes a casing 62 with a rectangular or substantially rectangular parallelepiped shape extending in the longitudinal direction and lateral direction and includes a card slot 63 that allows a card information medium 202 to be inserted therein and removed therefrom.

The card information medium 202 includes the antenna device 201 disposed therein. The card information medium 202 is a small card device attachable to and detachable from a terminal main body, such as a memory card, for example, a Secure Digital (SD) card (registered trademark), or a subscriber identity module (SIM) card. The card information medium 202 includes the antenna device 201 connected to a Radio Frequency Integrated Circuit (RFIC) element.

A wiring board disposed in the casing 62 is provided with a slot case. The slot case defines a space that allows the card information medium 202 to be attached thereto and detached therefrom between the wiring board and the slot case.

As described above, an electronic apparatus that does not have a wireless communication system is able to be made to support a communication system in the high frequency (HF) band or ultrahigh frequency (UHF) band by inserting the card information medium 202 according to a preferred embodiment of the present invention into the card slot 63 in the electronic apparatus. Accordingly, the electronic apparatus with the card information medium 202 according to a preferred embodiment of the present invention inserted therein is able to perform transmission and reception of data with an external electronic apparatus and other external apparatuses by near field communication using magnetic coupling.

The "electronic apparatus" in the present preferred embodiment indicates various kinds of electronic apparatuses, including a cellular phone terminal, such as a smartphone or feature phone, a wearable terminal, such as a smartwatch or smartglasses, a portable PC, such as a notebook PC or tablet PC, an information appliance, such as a camera, game machine, or toy, and an information medium, such as an IC tag, SD card, SIM card, or IC card.

Fourth Preferred Embodiment

Figure 10:
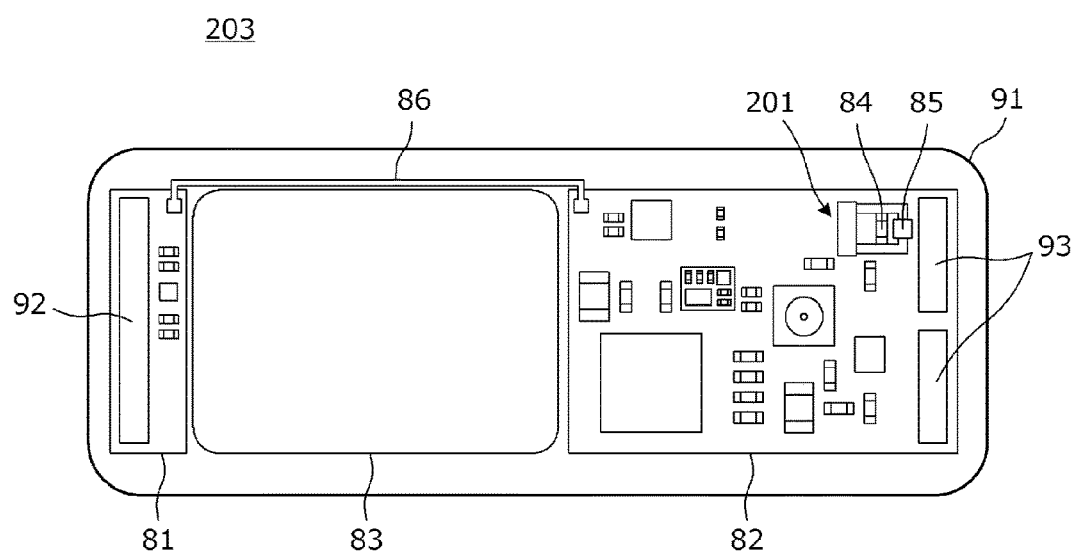
FIG. 10 is a plan view that illustrates the structure inside a casing of an electronic apparatus 203 according to a fourth preferred embodiment of the present invention.

In a fourth preferred embodiment of the present invention, an electronic apparatus incorporating an antenna device is illustrated. FIG. 10 is a plan view that illustrates the structure inside a casing of an electronic apparatus 203 according to the fourth preferred embodiment. Examples of the electronic apparatus in the present preferred embodiment may include a cellular phone, smartphone, tablet terminal, notebook PC, camera, game machine, toy, and wearable terminal, such as a smartwatch.

The electronic apparatus 203 includes the antenna device 201. Circuit boards 81 and 82, a battery pack 83, and the like are preferably housed in a casing 91. A UHF-band antenna 92 and the like are preferably mounted on the circuit board 81. The circuit boards 81 and 82 are connected to each other with a coaxial cable 86 interposed therebetween. A UHF-band antenna 93, a feed circuit 85 including a communication circuit, a surface mount device 84, and the antenna device 201 connected to the feed circuit 85 are mounted on the circuit board 82. The feed circuit 85 supplies electricity to the antenna device 201. An example of the surface mount device 84 is a chip capacitor for use in a resonance circuit.

In the above preferred embodiments, the antenna device and electronic apparatus in a communication system that mainly uses magnetic coupling, such as Near Field Communication (NFC), are described. The antenna device and electronic apparatus in the above-described preferred embodiments may also be used in a contactless power transfer system that employs magnetic coupling (electromagnetic induction type, magnetic resonance type). For example, the antenna device in the above-described preferred embodiments may be used in a power reception antenna device in a power reception apparatus in a contactless power transfer system of the magnetic resonance type used in the HF band, in particular, a frequency at or near 6.78 MHz. The antenna device may be used in a power transmission antenna device in a power transmission apparatus. In this case, the antenna device functions as a power reception antenna device or power transmission antenna device. In this case, both ends of the coil conductor included in the coil antenna in the antenna device are also connected to a power reception circuit or power transmission circuit that uses a certain frequency band (HF band, in particular, near 6.78 MHz).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a multilayer body including a plurality of insulating layers laminated in a lamination direction; and
a coil including a plurality of linear conductors and end-surface conductors, each of the linear conductors being disposed on a surface of the insulating layers and including two end portions and a main portion connecting the two end portions, the two end portions being positioned on outer edges of the insulating layers;
each of the end-surface conductors being disposed on an end surface parallel or substantially parallel to the lamination direction, the end-surface conductor connecting the two end portions in the linear conductors in the lamination direction; wherein
a width of the end-surface conductor is smaller than a width of the main portion, and an interval between the end-surface conductors adjacent to each other is wider than an interval between the main portions being next to each other in a direction parallel or substantially parallel with respect to the surfaces of the insulating layers and the end surface of the multilayer body.

2. The antenna device according to claim 1, wherein in the direction parallel or substantially parallel with respect to the surfaces of the insulating layers and the end surface of the multilayer body, a line width of each of the two end portions is smaller than a line width of the main portion.

3. The antenna device according to claim 2, wherein each of the two end portions has a line width that gradually decreases as a distance from the main portion increases.

4. The antenna device according to claim 2, wherein in each of the two end portions, a line width of a portion that is adjacent to the main portion is larger than a line width of a portion that is remote from the main portion.

5. The antenna device according to claim 1, wherein a width of a connection portion between the end-surface conductor and each of the two end portions differs from the line width of the end-surface conductor.

6. The antenna device according to claim 5, wherein the connection portion between the end-surface conductor and each of the two end portions is located inside the edges of the insulating layers.

7. The antenna device according to claim 1, wherein the end-surface conductor includes a plurality of interlayer connection conductors linked together.

8. The antenna device according to claim 7, wherein each of the interlayer connection conductors has a circular or oval cross-sectional shape.

9. A card information medium comprising:
an antenna; and
a memory; wherein
the antenna includes:
a multilayer body including a plurality of insulating layers laminated in a lamination direction; and
a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to the lamination direction, the end-surface conductor connecting the two end portions in the linear conductors in the lamination direction; and
a width of the end-surface conductor is smaller than a width of the main portion, and an interval between the end-surface conductors adjacent to each other is wider than an interval between the main portions being next to each other in a direction parallel or substantially parallel with respect to the surfaces of the insulating layers and the end surface of the multilayer body.

10. An electronic apparatus comprising:
an antenna; and
a casing that houses the antenna; wherein
the antenna includes:
a multilayer body including a plurality of insulating layers laminated in a lamination direction; and
a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to a lamination direction in which the insulating layers are laminated in the multilayer body, the end-surface conductor connecting the two end portions in the linear conductors in the lamination direction; and
parallel or substantially parallel to a width of the end-surface conductor is smaller than a width of the main portion, and an interval between the end-surface conductors adjacent to each other is wider than an interval between the main portions being next to each other in a direction parallel or substantially parallel with respect to the surface of the insulating layers and the end surface of the multilayer body.

11. A method for manufacturing an antenna device, the antenna device including:
a multilayer body including a plurality of insulating layers laminated in lamination direction; and
a coil including a plurality of linear conductors and end-surface conductors, each of the linear conductors being disposed on a surface of the insulating layers and including two end portions and a main portion connecting the two end portion, the two end portions being positioned on outer edges of the insulating layers, each of the end-surface conductors being disposed on an end surface parallel or substantially parallel to a lamination direction in which the insulating layers are laminated in the multilayer body, the end-surface conductor connecting the two end portions in the linear conductors in the lamination direction;
the method comprising the steps of:
forming a paste pattern corresponding to the plurality of linear conductors on the insulating layers;
forming through holes in the plurality of insulating layers and filling the through holes with conductive paste for the end-surface conductors;
laminating the plurality of insulating layers and firing them; and
cutting the multilayer body along a line passing through the plurality of end-surface conductor; wherein
a width of each of the end-surface conductors is smaller than a width of the main portions.

12. The antenna device according to claim 1, further comprising outer connection electrodes disposed on a principal surface of the multilayer body, the outer connection electrodes being electrically connected to ends of the coil.

13. The card information medium according to claim 9, further comprising outer connection electrodes disposed on a principal surface of the multilayer body, the outer connection electrodes being electrically connected to ends of the coil.

14. The electronic apparatus according to claim 10, further comprising outer connection electrodes disposed on a principal surface of the multilayer body, the outer connection electrodes being electrically connected to ends of the coil.

15. The method for manufacturing an antenna device according to claim 11, further comprising a step of forming outer connection electrodes on a principal surface of the multilayer body, the outer connection electrodes being electrically connected to ends of the coil.

16. The antenna device according to claim 1, wherein the linear conductors on one of the insulating layers are angled in a direction different from a direction in which the linear conductors on another one of the insulating layers are angled.

17. The card information medium according to claim 9, wherein the linear conductors on one of the insulating layers are angled in a direction different from a direction in which the linear conductors on another one of the insulating layers are angled.

18. The electronic apparatus according to claim 10, wherein the linear conductors on one of the insulating layers are angled in a direction different from a direction in which the linear conductors on another one of the insulating layers are angled.

19. The method for manufacturing an antenna device according to claim 11, wherein the linear conductors on one of the insulating layers are angled in a direction different from a direction in which the linear conductors on another one of the insulating layers are angled.

20. The card information medium according to claim 9, wherein the end-surface conductor includes a plurality of interlayer connection conductors linked together.

* * * * *